(12) United States Patent
Vodopyanov et al.

(10) Patent No.: US 7,349,609 B1
(45) Date of Patent: Mar. 25, 2008

(54) TERAHERTZ RADIATION GENERATION AND METHODS THEREFOR

(75) Inventors: Konstantin L. Vodopyanov, San Jose, CA (US); Martin M. Fejer, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/357,734

(22) Filed: Feb. 17, 2006

Related U.S. Application Data

(60) Provisional application No. 60/654,708, filed on Feb. 17, 2005.

(51) Int. Cl.
*G02B 6/00* (2006.01)
*G02F 1/35* (2006.01)
*G01J 5/02* (2006.01)

(52) U.S. Cl. .................. 385/122; 385/131; 359/326; 359/330; 359/300; 250/341.1; 250/341.8

(58) Field of Classification Search ............. 250/341.1, 250/341.8; 385/40, 1, 5, 22, 129–131, 3, 385/122; 359/160, 326, 300, 330; 372/21
See application file for complete search history.

(56) References Cited

U.S. PATENT DOCUMENTS

| 5,355,247 | A | 10/1994 | Byer et al. |
| 5,798,853 | A * | 8/1998 | Watanabe ................. 398/150 |
| 6,273,949 | B1 | 8/2001 | Eyres et al. |
| 6,282,014 | B1* | 8/2001 | Long ......................... 359/330 |
| 6,782,014 | B1* | 8/2004 | Vodopyanov ................ 372/21 |
| 6,828,558 | B1* | 12/2004 | Arnone et al. ........... 250/341.1 |
| 2005/0243876 | A1* | 11/2005 | Kung ......................... 372/21 |
| 2006/0013270 | A1* | 1/2006 | Yumoto et al. ............. 372/21 |
| 2006/0051025 | A1* | 3/2006 | Mizuuchi et al. ............ 385/40 |

* cited by examiner

*Primary Examiner*—Brian Healy
*Assistant Examiner*—Guy G Anderson
(74) *Attorney, Agent, or Firm*—Crawford Maunu PLLC

(57) ABSTRACT

Terahertz radiation generation systems and methods are implemented using a variety of methods and devices. According to an example embodiment of the present invention, method for generating terahertz radiation is implemented where the wavelength of an optical pulse is controlled, and where the wavelength is controlled as a function of the group velocity dispersion in a nonlinear crystal. The optical pulse is then directed through consecutively-inverted parallel domains in the nonlinear crystal.

35 Claims, 3 Drawing Sheets

TERAHERTZ RADIATION GENERATION AND METHODS THEREFOR

RELATED PATENT DOCUMENTS

This patent document claims the benefit, under 35 U.S.C. §119(e), of U.S. Provisional Patent Application No. 60/654,708 filed on Feb. 17, 2005 and entitled: "Generation of Terahertz Radiation in Orientation-Patterned Semiconductors."

FIELD OF THE INVENTION

The present invention relates generally to approaches to the generation of terahertz radiation and improvements thereof.

BACKGROUND

Terahertz (THz) radiation is radiation having a frequency on the order of $10^{12}$ hertz (Hz) and shows increasingly promise in a variety of applications including medical imaging without harmful radiation, computing, observing quantum phenomena, and security. A known method of THz generation is by optical down-conversion in nonlinear optical materials using a laser-pulse to create a time-dependent polarization that radiates an electric field. The efficiency of THz generation in optical down-conversion processes, however, is low even in the most efficient of the current systems. To being with, optical-to-THz conversion efficiency is taught to be limited by the Manley-Rowe photon conversion limit. The Manley-Rowe limit relies upon an assumption that the number of generated THz photons cannot exceed the number of pump optical photons. In traditional schemes for generating THz radiation with a frequency of omega1 this limit is expressed by the following basic principles. The traditional schemes often involve introducing an optical beam with a frequency omega3 into a material that interacts with the optical beam (omega3) to generate optical beams having a frequency other than omega3. For example, generation of THz radiation having a frequency of omega1 has been accomplished by the mixing of two optical beams with frequencies omega2 and omega3, so that omega1=omega3−omega2. The Manley-Rowe limit assumes that even if all the photons of the optical beam with a frequency of omega3 are converted to beams with the frequency omega2 and omega1, the energy of the omega1 beam can never exceed the conversion factor related to omega1/omega3.

In addition, typical interactions between generated THz radiation and the optical pulses are short. This short interaction length between THz and optical pulses is a result of phase and group velocity-mismatch between optical and THz waves due to the strong dispersion of nonlinear materials. Optical down-conversion is most efficient in ZnTe crystals, where the coherence length reaches several millimeters. However, group velocity dispersion also leads to broadening of femtosecond optical pulses in ZnTe reducing the peak power and conversion efficiency.

The interaction length between THz and optical pulses can be extended in quasi-phase matching (QPM) structures. The fundamental idea is to exploit the velocity mismatch between the optical and THz pulses in a poled nonlinear crystal to generate a THz waveform, which corresponds to the domain structure of the poled nonlinear crystal.

Newly developed orientation-patterned GaAs (OP-GaAs) has been suggested for improving the effectiveness of THz generation in QPM structures, as taught by U.S. Pat. No. 6,273,949 and U.S. Pat. No. 5,355,247; each of these patent documents is fully incorporated herein by reference. While the conversion efficiency of these methods is increased, these methods still leave room for improvement.

These and other issues have presented challenges to the generation of THz radiation, including improving the efficiency of THz radiation generation.

SUMMARY

The claimed invention is directed to generating THz radiation. The present invention is exemplified in a number of implementations and applications, some of which are summarized below.

Various example embodiments of the present invention are directed to increasing the efficiency of generating THz radiation. In one embodiment, an optical down conversion method is implemented to increase the power of the generated THz radiation in relation to the input power.

One embodiment involves a method for facilitating the cascading optical down conversion of photons in an optical pulse directed to a nonlinear crystal having alternating parallel domains that are consecutively inverted. The method is used to generate THz radiation from the cascading optical down conversion. The optical pulse is directed through a nonlinear crystal having alternating domains and controlled so as to have a wavelength that is a function of the group velocity dispersion value (GVD), as related to the nonlinear crystal. To compensate for frequency shifting of the optical pulse from the generation of THz radiation, the thickness of the domains of the nonlinear crystal is varied.

In another embodiment, source radiation is directed through a medium arranged to generate THz radiation. The source radiation's wavelength is near the wavelength value where the GVD is 0, resulting in a photon contributing to the creation of more than one THz photon (cascading down conversion).

In another embodiment, a medium for passing optical energy contains alternating parallel domains wherein the width of one alternating domain is less than a previous domain and more than a subsequent domain.

In yet another embodiment, a medium for passing optical energy contains alternating parallel domains wherein the widths of each consecutive domain are less than the domain width of the preceding domain.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
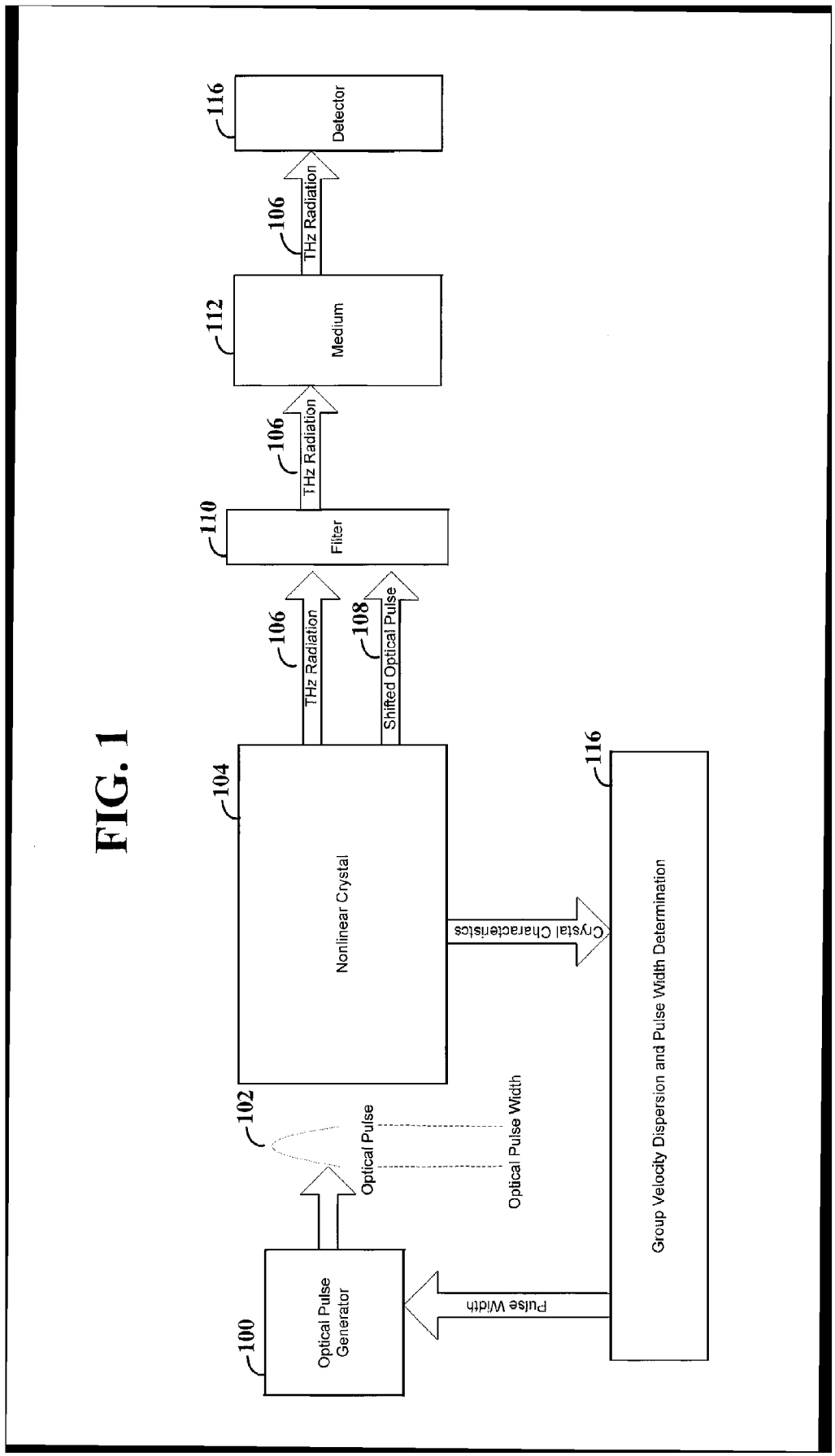
FIG. 1 shows an arrangement and method for the generation and use of THz radiation; according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for use in the generation of THz radiation. While the present invention is not necessarily limited to such applications, various aspects of the invention may be appreciated through a discussion of various examples using this context.

The following discussion describes the method and arrangements for facilitating the generation of THz radiation. While some embodiments include a nonlinear crystal which is constructed from GaAs (such as is taught in the above-referenced patent documents), other semiconductor materials may also be suitable for construction of the nonlinear crystal (e.g., a zinc-blende semiconductor, a III-V semiconductor, or a II-VI semiconductor). The semiconductor materials are generally selected for their relative transparency over the THz frequencies, their relatively high nonlinear optical coefficients, their relatively low dispersion effects at the THz and infrared frequency ranges, or their ability to conform to the above criteria at near room temperatures. In addition to the material used to create the nonlinear crystal, the nonlinear crystals are constructed according to several different embodiments. One such embodiment involves orientation-patterned semiconductors where the domains of the crystal are periodically inverted to produce THz radiation of a desired frequency. The inversion of the domains serves to compensate for the phase velocity mismatch between the supplied optical energy and the THz radiation.

Several embodiments of the present invention are directed to increasing the efficiency of THz radiation generation by implementing various methods for facilitate cascading down conversion of an optical pulse to produce THz radiation. Cascading down conversion occurs when a photon contributes to the generation of more than one THz radiation photon. Accordingly, the efficiency of the THz radiation generation can be increased over methods which do not facilitate cascading down conversion.

In an example embodiment, a femtosecond optical pulse is optically down converted in the generation of THz radiation. Optical down-conversion of femtosecond pulses can be considered as a parametric process in which a photon from the blue wing of the spectrum of the femtosecond pulse is converted to the red wing (i.e. its frequency is reduced), by emitting a THz photon. Once an optical photon is red-shifted (by $\Delta\lambda \sim 27$ nm for 2 THz), it can still contribute to THz generation, as long as the group velocity of the red-shifted pulse is near the phase velocity of the THz wave. In this cascaded process, each optical photon can generate several THz photons, increasing the THz generation efficiency. For example, pumping OP-GaAs at 2 µm allows approximately 3 cascaded processes to occur (due to low group velocity dispersion in this range).

Cascaded down-conversion efficiency can be increased when the pump wavelength is close to the point of zero group velocity dispersion. Quantitatively, the number of cascading cycles can be expressed as N=½ (acceptance bandwidth)/(THz frequency). Here, the acceptance bandwidth is with respect to the pump frequency and can be expressed as:

$$\Delta v_{pump}^{accept} = \frac{c}{L} \frac{v_{pump}}{v_{THz}} \left( \lambda \frac{dn_{gr}}{d\lambda} \right)^{-1}$$

Where c is the speed of light, L is the length of the crystal, $v_{pump}$ is the optical pump frequency, $v_{THz}$ is the THz frequency, $\lambda$ is the optical wavelength, $n_{gr}$ is the optical group refractive index. From these equations it can be shown that the number of THz cascading cycles in GaAs can be greater than 10 where the optical pulse wavelength is 2 to 3.5 µm. The number of cascading cycles can be further increased if the optical pump wavelength is closer to the value where the group velocity dispersion is zero (e.g., approximately 6.6 µm for GaAs, where N can be near 70). Thus, THz conversion efficiency can be significantly above the Manley-Rowe limit.

The emission frequency of the THz radiation propagating in the same direction as the optical pulse is determined by the domain inversion period $\Lambda$, so that $v_{THz}=c/\Lambda(n_{THz}-n_{opt})$, where $n_{THz}$ is the refractive index at THz frequency and $n_{opt}$ is the group index of an optical pulse. If there is a significant cascading effect, such that N (cascading) is greater than 1, the optical frequency changes enough to result in a substantial change in the refractive index $n_{opt}$. Domains of varying thickness may be employed for yielding variable $\Lambda$, so that $\Lambda(n_{THz}-n_{opt})$ will remain constant along the crystal. For example, using GaAs and a 2.13 µm beam ($n_{gr}$=3.4145) as an optical pump to generate 2 THz frequency (n=3.6) and a pump intensity for which 10 cascading steps are possible over the length of the crystal. In this case, the pump wavelength will be red-shifted in frequency by 10×2 THz (10 THz photon frequencies). Accordingly, the red-shifted optical pulse will have a wavelength of 2.48 µm ($n_{gr}$=3.3825) at the exit of the crystal. For an emission frequency of 2 THz the inversion period $\Lambda$ at the beginning of the crystal should be $\Lambda$=3e16/2e12/(3.6−3.4145)=808.6 µm, and at the end of the crystal, the inversion period should be $\Lambda$=3e16/2e12/(3.6−3.3825)=689.7 µm. Thus, in one embodiment the GaAs crystal could have an inversion period (domain widths) which varies, over its length, from 809 to 690 µm.

The efficiency of the process can be approximated using the following formulas (at zero phase-mismatch):

$$I_1 = \frac{8\pi^2 d_{eff}^2}{n_1 n_2 n_3 c \varepsilon_0 \lambda_{THz}^2} I_2 I_3 \cdot L^2,$$

In this equation: $I_1$ is the THz intensity; $I_2$, and $I_3$ are the optical intensities; $\lambda_i$ and $n_i$ are corresponding wavelengths and refractive indices; and L is the crystal length. For optimal focusing (that is close to confocal with respect to the THz wave), the conversion efficiency becomes linearly proportional to the crystal length and the optical peak power P:

$$\eta_{THz} = \frac{8\pi^2 d_{eff}^2}{n^2 c \varepsilon_0 \lambda_{THz}^3} \cdot L \cdot P$$

For the known GaAs nonlinear coefficient $d_{eff}=2/\pi \times d_{14}=60$ pm/V ($2/\pi$ appears because of the QPM process), and the refractive indices $n(2 \mu m)=3.43$ and $n(2 \text{ THz})=3.61$, this transforms into:

$$\eta_{THz} \approx \frac{0.1}{\lambda_{THz}^3[\mu m]} \cdot L[cm] \cdot P[W]$$

Thus, a confocal configuration (optical beam width 450 µm) results in the internal power conversion efficiency of 0.44% for 2 THz radiation generated in a 3-cm-long OP-GaAs structure pumped by 250-fs pulses from a 1-W laser, operating at 2-µm wavelength and 80-MHz repetition rate (such as an ultra fast fiber laser). Accounting for THz absorption in GaAs ($\alpha=1$ cm$^{-1}$), the conversion efficiency is approximately 0.1%, corresponding to output power of 1 mW.

Turning now to the figures, FIG. 1 shows a method and arrangement for generating THz radiation. It includes optical pulse generator 100, nonlinear crystal 104, and block 116. Block 116 is shown as receiving information regarding the nonlinear crystal 104. This information can include a number of different characteristics that affect the THz generation process. Examples of a few characteristics include the refractive index for different wavelengths, the length of nonlinear crystal 104, the width of any domains in nonlinear crystal 104, the GVD value of different wavelengths, the temperature, feedback from the optical output of nonlinear crystal 104, and the expected number of cascaded down conversion to occur within the nonlinear crystal 104. This information is used to determine the optimal pulse width generated by optical pulse generator 100. In one embodiment, block 116 determines the wavelength where GVD value is sufficiently close to zero. The optical pulse generator 100 is then controlled so as to generate a pulse having a wavelength sufficiently close to where the GVD value is zero.

After the pulse width is determined and optical pulse 102 is generated, the optical pulse generator 100 directs optical pulse 102 through the nonlinear crystal 104. The pulse travels through and interacts with nonlinear crystal 104 resulting in THz radiation 106 and shifted optical pulse 108. In one embodiment, the filter 110 allows the THz radiation 106 to pass but not the shifted optical pulse. As discussed above, this emitted THz radiation 106 can be used in a number of different manners. For example, the medium 112 could represent security screening or medical imaging applications where the medium is a person or luggage. After passing through medium 112, the THz radiation can be collected by detector 116 and examined as the application requires.

Block 116 can be implemented using a computer that collects the relevant characteristics and generates an output representing the acceptable wavelengths for optical pulse 102. The output may be a control signal to optical pulse generator 100, or it could be an output to an operator or designer of the method or system that uses that information to select an optical pulse generator with the appropriate capabilities. In another embodiment, block 116 may be a human operator who determines the wavelength based upon the known characteristics of nonlinear crystal 104. Alternatively, an electrical circuit could be constructed to provide an output to optical pulse generator 100 or the operator of the system. Thus, the controlling of the wavelength may be in response to real-time inputs related to the crystal characteristics. These real-time inputs can be used to make adjustments of the wavelength during the THz radiation generation processes. In another example, the wavelength may be determined prior to the THz generation, and the wavelength of the optical pulse would remain constant during the THz radiation generation processes.

Other factors that have been shown in increase the efficiency of the THz generation process include the length of the nonlinear crystal and the optical pulse intensity. For instance, a nonlinear crystal having a length of over 1 centimeter and an optical pulse of over 1 Watt can increase the efficiency of the THz generation by increasing the number of cascading down conversions that occur. An important factor in determining the optimal length of the nonlinear crystal is the amount of THz absorption that occurs in the nonlinear crystal (i.e., lower absorption factors can increase the optimal length of the nonlinear crystal).

In more specific embodiments, the present invention employs teachings of U.S. Pat. No. 6,273,949 and U.S. Pat. No. 5,355,247 (e.g., Col. 6:4-13), as they relate to the structure, properties and operation of relevant nonlinear crystals. These patents are incorporated herein by reference, generally and specifically as discussed above.

Figure 2:
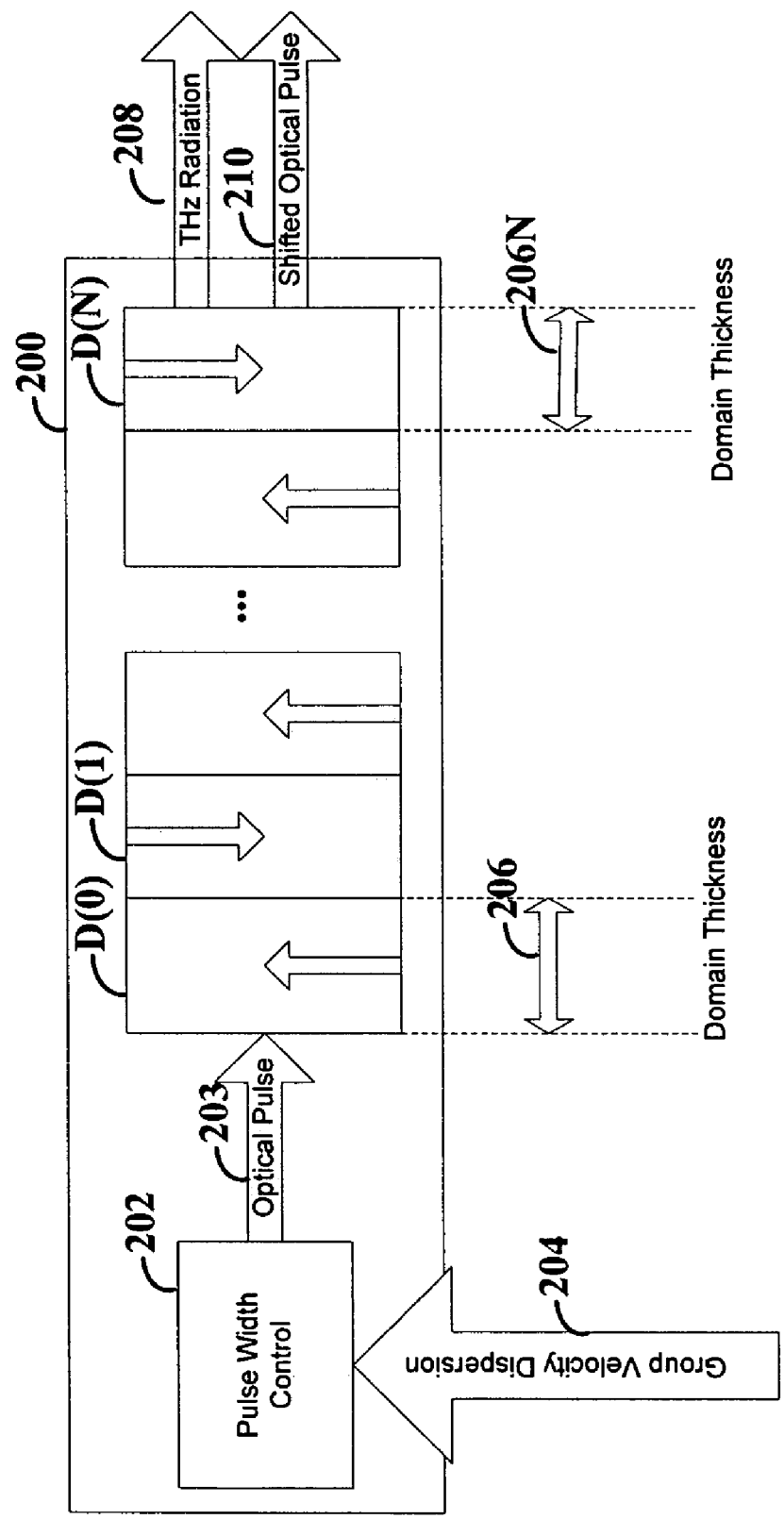
FIG. 2 shows an arrangement and method for the generation of THz radiation; according to another example embodiment of the present invention.

FIG. 2 shows an arrangement for generating THz radiation, according to another example embodiment of the present invention. FIG. 2 shows the THz generating block 200 that includes pulse width control 202, and a nonlinear crystal with domains D(0) to D(N).

The output of pulse width control 202 is optical pulse 203. In one embodiment optical pulse 203 has a wavelength determined by the GVD value 204 of the nonlinear crystal. For example, optical pulse 203 might have wavelength near where the GVD value is 0. In another embodiment, optical pulse 203 has a wavelength such that number of expected optical down conversions exceeds the Manely Rowe limitation (i.e., where the wavelength produces cascading down conversion). Optical pulse 203 is directed to the nonlinear crystal having alternating parallel domains D(0) to D(N). The result of optical pulse 203 passing through the nonlinear crystal is shifted optical pulse 210 and THz radiation 208.

The construction of the nonlinear crystal typically involves creating the nonlinear crystal to have domains D(0) to D(N) with desired widths 206 to 206N. In one embodiment, domains D(0) to D(N) are constructed to produce QPM between the optical pulse and the generated THz radiation. In another embodiment, the domains are constructed to compensate for the frequency shift of the optical pulse as THz radiation is generated. It is also envisioned that the domains are constructed to both produce QPM and to compensate for the frequency shift of the optical pulse as it passes through the nonlinear crystal. Additional factors may also be used in constructing the nonlinear crystal.

Figure 3:
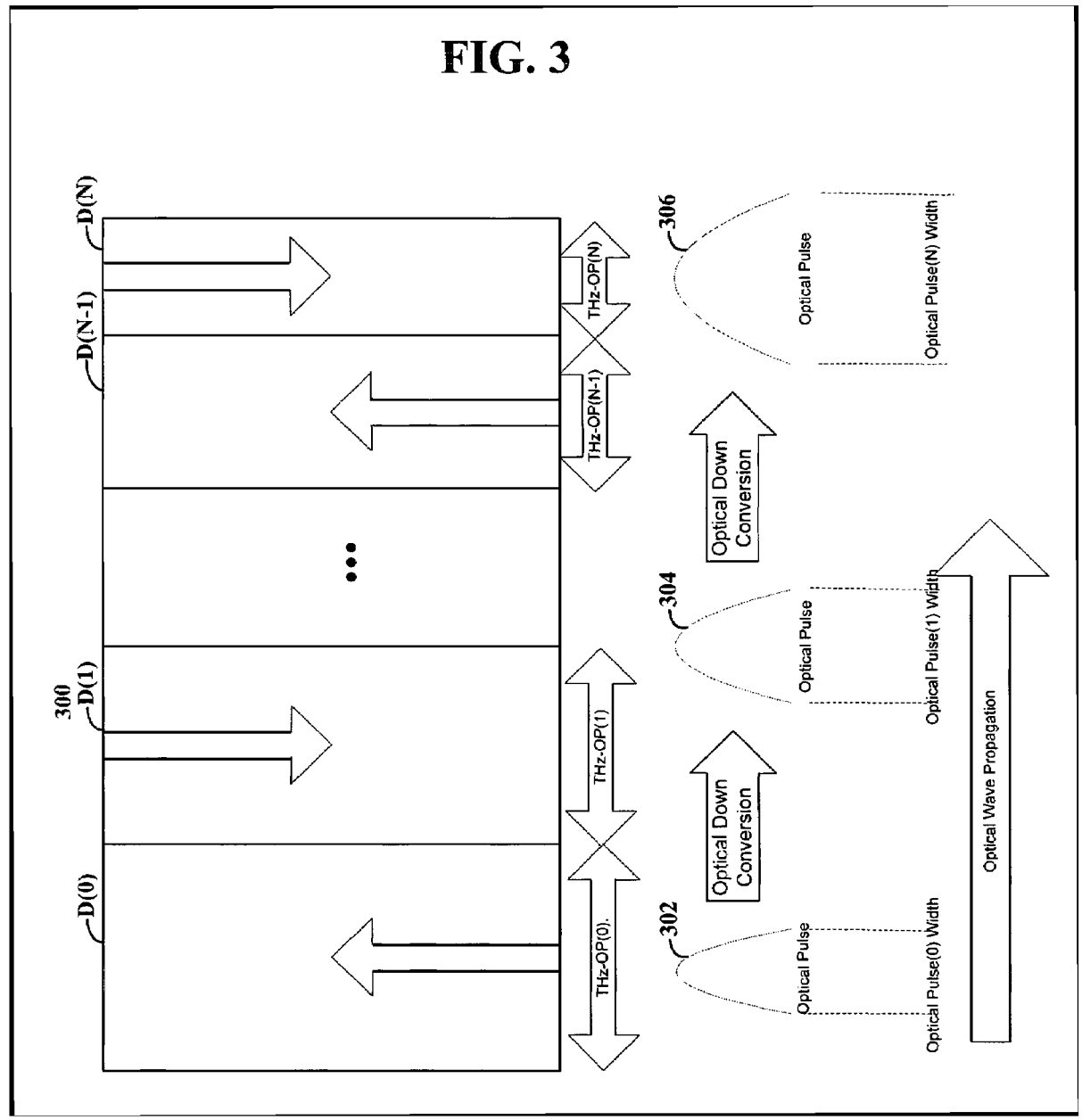
FIG. 3 shows an arrangement for the generation of THz radiation, according to another example embodiment of the present invention.

FIG. 3 shows an arrangement for the generation of THz radiation, according to another example embodiment of the present invention. FIG. 3 shows nonlinear crystal 300 and domains D(0) to D(N). Nonlinear crystal 300 is designed so that an optical pulse can be directed to travel from D(0) to D(N) and such that D(0) to D(N) consist of alternating parallel domains as shown by the alternating arrows in D(0) to D(N). In one embodiment, a domain has a domain width that is less than a previous domain and greater than a subsequent domain (as determined by the direction the optical pulse travels). For instance, D(1) might have a domain width that is less than D(0) but greater than D(N). This variance of the domain widths compensates for the shifting of the optical pulse as THz radiation is generated by optical down conversion.

In another embodiment, the domain widths are selected for QPM between an optical pulse and generated THz radiation. This QPM matching typically can be determined from the difference in phase velocity between the THz radiation and the optical pulse. The domain widths can also be modified based upon the desired waveform and frequency of the THz radiation.

In another example embodiment, each domain width is less than the previous domain width. In one instance, the amount that the domain widths vary is calculated as a function of the optical pulse wavelength and the number of cascaded down conversions that occur in the nonlinear crystal. Thus, the domain widths decrease along a length of the crystal because the number of cascading down conversions of the optical pulse increases as the optical pulse propagates along the length of the crystal. This is shown by optical pulses 302, 304 and 306 which have increasing pulse widths as a result of optical down conversion. Based upon the increased pulse widths, the domain widths may be determined as a function of the difference between the shifted optical pulse frequency OP(0) to OP(N) and the generated THz radiation. This relationship is shown below each domain width by the bi-directional arrows. Typically, as the frequency of the optical pulse decreases, the phase mismatch between the optical pulse and the THz radiation increases. As discussed above, the QPM is typically dependent upon the phase mismatch, and therefore, an increased phase mismatch necessitates a decrease in domain widths.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include implementing the invention using nonlinear crystal materials other than GaAs. Such modifications and changes do not depart from the true spirit and scope of the present invention, which is set forth in the following claims.

What is claimed is:

1. A method for generating terahertz radiation, the method including the steps of:
   controlling the wavelength of an optical pulse as a function of the group velocity dispersion in a nonlinear crystal; and
   directing the optical pulse through consecutively-inverted parallel domains in the nonlinear crystal.

2. The method of claim 1, wherein at least some of the terahertz radiation is produced through cascading down conversion.

3. The method of claim 1, further including the step of varying the width of the consecutively-inverted parallel domains as a function of the optical pulse wavelength and the terahertz radiation wavelength.

4. The method of claim 3, wherein the varying of the width of the consecutively-inverted parallel domains results in quasi-phase-matching between the optical pulse and the terahertz radiation.

5. The method of claim 1, wherein the nonlinear crystal is a semiconductor material.

6. The method of claim 1, wherein the nonlinear crystal is GaAs.

7. The method of claim 6, wherein the optical pulse has a wavelength of about 1.5 micrometers to about 11 micrometers.

8. The method of claim 6, wherein the optical pulse wavelength is near 6.6 micrometers.

9. The method of claim 3, wherein the varying of the width of the consecutively-inverted parallel domains compensates for an increase in the optical pulse wavelength as the optical pulse passes through the nonlinear crystal.

10. A method for facilitating the cascading optical down conversion of photons in an optical pulse directed to a nonlinear crystal having alternating parallel domains that are consecutively inverted, and for generating terahertz radiation from the cascading optical down conversion the method including the steps of:
    controlling the wavelength of the optical pulse as a function of the group velocity dispersion in the nonlinear crystal;
    directing the optical pulse through the alternating parallel domains of the nonlinear crystal; and
    varying the width of the alternating parallel domains to compensate for frequency shifting of the optical pulse due to the generation of terahertz radiation.

11. The method of claim 10, wherein the optical pulse has a wavelength of about 1.5 um to about 11 um.

12. The method of claim 11, wherein the optical pulse power is greater than about 1 Watt.

13. The method of claim 10, wherein the nonlinear crystal is GaAs.

14. The method of claim 13, wherein the nonlinear crystal is longer than about 2 centimeters.

15. The method of claim 10, wherein the widths of alternating parallel domains are decreased along the length of the nonlinear crystal.

16. The method of claim 10, wherein the widths of the alternating parallel domains are decreased along the length of the nonlinear crystal as a function of the number of cascaded down conversions in the nonlinear crystal, the frequency shift of the optical pulse due to the cascaded down conversions, and the refractive index of the optical pulse in the nonlinear crystal.

17. The method of claim 10, wherein the optical pulse wavelength is such that the group velocity dispersion is near zero in the nonlinear crystal.

18. The method of claim 13, wherein the optical pulse wavelength is near 6.6 um.

19. The method of claim 10, wherein the controlling of the optical pulse wavelength is also a function of the length of the nonlinear crystal, the frequency of the terahertz radiation, and the optical group refractive index of the optical pulse in the nonlinear crystal.

20. The method of claim 10, wherein the optical pulse has a wavelength where N is greater than or equal to 2 and $N=(C/L)*(Vp/Vthz)*(1/(W*S))$ where C is the speed of light, L is the length of the nonlinear crystal, Vp is the frequency of the optical pulse, Vthz is the frequency of the terahertz radiation, W is the wavelength of the optical pulse, and S is the derivative of the refractive index with respect to the optical pulse wavelength, and where the refractive index is for the optical pulse in the nonlinear crystal.

21. A terahertz radiation generating arrangement comprising:

a nonlinear crystal having consecutively-inverted parallel domains; and an optical pulse generator that emits an optical pulse that is directed through the consecutively-inverted parallel domains, wherein the optical pulse wavelength is a function of the group velocity dispersion in the nonlinear crystal.

22. The terahertz radiation generating arrangement of claim 21, wherein the nonlinear crystal is an orientation-patterned semiconductor.

23. The terahertz radiation generating arrangement of claim 21, wherein the consecutively-inverted parallel domains are arranged to provide quasi-phase-matching between the optical pulse and the generated terahertz radiation.

24. The terahertz radiation generating arrangement of claim 21, wherein the optical pulse wavelength is about where the group velocity dispersion is 0.

25. The terahertz radiation generating arrangement of claim 21, wherein the optical pulse wavelength is such that N is greater than or equal to 2 where N=(C/L)*(Vp/Vthz)* (1/(W*S)), C is the speed of light, L is the length of the nonlinear crystal, Vp is the frequency of the optical pulse, Vthz is the frequency of the terahertz radiation, W is the wavelength of the optical pulse, and S is the derivative of the refractive index with respect to the optical pulse wavelength, and where the refractive index is for the optical pulse in the nonlinear crystal.

26. The terahertz radiation generating arrangement of claim 21, wherein the widths of the consecutively-inverted parallel domains are decreased along the length of the nonlinear crystal as a function of the number of cascaded down conversions in the nonlinear crystal, the frequency shift of the optical pulse due to the cascaded down conversions, and the refractive index of the optical pulse in the nonlinear crystal.

27. For generating terahertz radiation, a nonlinear crystal comprising a plurality of contiguously arranged domains with at least one domain having a domain width that is less than a domain width of a first domain and that is greater than a domain width of a subsequent domain and for passing optical energy from the first domain through subsequent domains.

28. The nonlinear crystal of claim 27, wherein the optical energy passes through a portion of the nonlinear crystal having a length of at least 1 centimeter.

29. The nonlinear crystal of claim 27, wherein the nonlinear crystal is a semiconductor material.

30. The nonlinear crystal of claim 27, wherein the nonlinear crystal is GaAs.

31. The nonlinear crystal of claim 27, wherein the first domain width is a function of the difference between the phase velocity of the terahertz radiation and the optical energy.

32. The nonlinear crystal of claim 27, wherein the difference of widths between the first domain and a domain having a domain width that is less than a domain width of the first domain is a function of the change in the wavelength of the optical energy due to terahertz radiation generation as it passes from the first domain to the said domain having a domain width that is less than a domain width of a first domain.

33. The nonlinear crystal of claim 27, wherein each of the domain widths of each of the successive domain are less than the preceding domain and wherein the domain widths are a function of the number of optical down conversions that occur within the nonlinear crystal.

34. The nonlinear crystal of claim 27, wherein the domain widths of the nonlinear crystal produce quasi-phase-matching between the terahertz radiation and the optical energy.

35. An arrangement for generating terahertz radiation, the arrangement comprising:

means for controlling the wavelength of an optical pulse as a function of the group velocity dispersion in a nonlinear crystal; and means for directing the optical pulse through consecutively-inverted parallel domains in the nonlinear crystal.

* * * * *